United States Patent
Schmunk

(10) Patent No.: US 8,635,805 B1
(45) Date of Patent: Jan. 28, 2014

(54) BAIT RETAINER AND DISPENSER APPARATUS

(76) Inventor: William Henry Schmunk, Fall River Mills, CA (US)

(*) Notice: Subject to any disclaimer, the term of this patent is extended or adjusted under 35 U.S.C. 154(b) by 586 days.

(21) Appl. No.: 12/840,428

(22) Filed: Jul. 21, 2010

Related U.S. Application Data

(60) Provisional application No. 61/236,482, filed on Aug. 24, 2009.

(51) Int. Cl.
*A01K 97/06* (2006.01)
*A01K 83/06* (2006.01)

(52) U.S. Cl.
USPC .................. 43/54.1; 43/4; 43/44.2; 43/44.8; 206/540; 221/208; 221/236; 221/266; 221/288; 221/303; 221/312 R; 433/3

(58) Field of Classification Search
USPC ............... 43/54.1, 4, 55, 44.2, 44.8; 206/540; 221/41, 208, 236, 266, 288, 303, 312 R; 433/81, 3
See application file for complete search history.

(56) References Cited

U.S. PATENT DOCUMENTS

| | | | | |
|---|---|---|---|---|
| 67,424 | A * | 8/1867 | Ely et al. ..................... 221/303 |
| 1,791,723 | A * | 2/1931 | Hampton ...................... 43/44.8 |
| 1,955,559 | A * | 4/1934 | Narrow .......................... 43/55 |
| 2,086,296 | A * | 7/1937 | Gilbert ......................... 221/263 |
| 2,115,493 | A * | 4/1938 | Kosten .......................... 43/44.8 |
| 2,117,685 | A * | 5/1938 | Smith, Jr. ........................ 43/55 |
| 2,482,881 | A * | 9/1949 | Sonner, Jr. ..................... 43/57.1 |
| 2,492,557 | A * | 12/1949 | Deimler ......................... 43/44.8 |
| 2,540,276 | A * | 2/1951 | Moler ............................ 43/44.2 |
| 2,540,499 | A * | 2/1951 | Towne ........................... 221/281 |
| 2,582,821 | A * | 1/1952 | Duell et al. ................... 221/288 |
| 2,586,186 | A * | 2/1952 | Swanberg ..................... 43/42.39 |
| 2,605,892 | A * | 8/1952 | Waber et al. ................... 43/54.1 |
| 2,627,973 | A * | 2/1953 | Sines ............................ 221/266 |
| 2,754,030 | A * | 7/1956 | Waber et al. ................. 221/312 R |
| 2,766,763 | A * | 10/1956 | Shough ......................... 221/281 |
| 2,771,704 | A * | 11/1956 | Biggs ............................. 43/57.1 |
| 2,782,550 | A * | 2/1957 | Breti .............................. 43/44.4 |
| 2,794,289 | A * | 6/1957 | Sanford ........................... 43/55 |
| 2,795,885 | A * | 6/1957 | Imberti .......................... 43/44.4 |
| 2,816,393 | A * | 12/1957 | Kmonk ............................ 43/55 |
| 2,838,204 | A * | 6/1958 | Snyder .......................... 221/307 |
| 2,857,705 | A * | 10/1958 | Woodcock ........................ 43/55 |
| 2,886,208 | A * | 5/1959 | Sinclair ......................... 221/288 |

(Continued)

OTHER PUBLICATIONS http://www.darbydental.com/scripts/prodpage.aspx?CAT=22 &SUB=25 . . . , showing Sure-Stop(TM) May 13, 2009.

*Primary Examiner* — Darren W Ark
(74) *Attorney, Agent, or Firm* — Edward S. Sherman

(57) ABSTRACT

A single small elastic disk, which may or may not include a central perforation, is dispensed from the storage cavity of the device into a holding channel at the edge thereof so that it can be threaded onto a fishhook to serve as a bait retainer. The lateral movement of the hook from the edge of the dispenser removes the retainer from the channel, so that is placing firmly on the shaft of the fishhook. The central portion, being opened by the fishhook tip before removal from the dispenser, will exert a gripping force when disposed on the shaft or shank portion of a fish hook. Preferably, the disk portion of one such retainer when placed against adjacently threaded bait or lures will retain them on the hook during use until the bait or lure is intentionally removed.

20 Claims, 5 Drawing Sheets

(56) References Cited

U.S. PATENT DOCUMENTS

| | | | | |
|---|---|---|---|---|
| 2,893,599 A | * | 7/1959 | Kay | 221/267 |
| 2,918,167 A | * | 12/1959 | Lowen | 221/312 R |
| 2,960,259 A | * | 11/1960 | Aveni | 221/312 R |
| 2,982,049 A | * | 5/1961 | Yost | 43/44.8 |
| 3,018,921 A | * | 1/1962 | Hermanson | 221/267 |
| 3,034,250 A | * | 5/1962 | Laba | 43/44.8 |
| 3,042,257 A | * | 7/1962 | Dailey | 221/309 |
| 3,065,561 A | * | 11/1962 | Swanson | 43/4 |
| 3,114,984 A | * | 12/1963 | Atton | 43/44.9 |
| 3,118,245 A | * | 1/1964 | Shriver | 43/44.2 |
| 3,163,958 A | * | 1/1965 | Quinn | 43/44.8 |
| 3,271,890 A | * | 9/1966 | Davis | 43/4 |
| 3,308,570 A | * | 3/1967 | Horton | 43/55 |
| 3,357,086 A | * | 12/1967 | Hood | 43/4 |
| 3,363,357 A | * | 1/1968 | Sokol | 43/57.1 |
| 3,398,857 A | * | 8/1968 | Alio | 221/288 |
| 3,412,897 A | * | 11/1968 | Slater | 221/309 |
| 3,492,752 A | * | 2/1970 | Viveiros | 43/44.8 |
| 3,541,722 A | * | 11/1970 | Garrison | 43/4 |
| 3,746,154 A | * | 7/1973 | Gach | 221/312 R |
| 3,863,383 A | * | 2/1975 | Lore | 43/44.8 |
| 3,874,564 A | * | 4/1975 | Huneke | 221/266 |
| 3,976,219 A | * | 8/1976 | Pagnoni | 273/288 |
| 4,047,320 A | * | 9/1977 | Lee | 43/55 |
| 4,071,948 A | * | 2/1978 | Deutzmann | 221/310 |
| 4,104,820 A | * | 8/1978 | Bardebes | 43/36 |
| 4,110,931 A | * | 9/1978 | Maness | 43/55 |
| 4,118,807 A | * | 10/1978 | McCauley | 43/4 |
| 4,121,368 A | * | 10/1978 | Norwood | 43/57.1 |
| 4,127,219 A | * | 11/1978 | Mabus | 221/303 |
| 4,172,523 A | * | 10/1979 | Weglage | 221/307 |
| 4,207,993 A | * | 6/1980 | Ellis et al. | 43/55 |
| 4,226,335 A | * | 10/1980 | Sowards | 43/55 |
| 4,428,146 A | * | 1/1984 | Walker | 43/55 |
| 4,483,092 A | * | 11/1984 | Steiner | 43/55 |
| 4,502,612 A | * | 3/1985 | Morrison | 221/288 |
| 4,557,690 A | * | 12/1985 | Randin | 221/288 |
| 4,564,125 A | * | 1/1986 | Esslinger | 221/288 |
| 4,648,529 A | * | 3/1987 | Blakemore et al. | 221/288 |
| 4,653,668 A | * | 3/1987 | Gibilisco et al. | 221/289 |
| 4,723,531 A | * | 2/1988 | Hampton | 221/288 |
| 4,815,230 A | * | 3/1989 | Allen | 43/55 |
| 4,874,348 A | * | 10/1989 | Lafreniere et al. | 221/309 |
| 5,038,513 A | * | 8/1991 | Hardin | 43/44.8 |
| 5,054,647 A | * | 10/1991 | Yawata | 221/41 |
| 5,067,270 A | * | 11/1991 | Garrick | 43/55 |
| 5,274,947 A | * | 1/1994 | Griffiths | 43/44.8 |
| D370,048 S | * | 5/1996 | Smith | D22/144 |
| 5,525,314 A | * | 6/1996 | Hurson | 433/77 |
| 5,549,227 A | * | 8/1996 | Klotz | 43/54.1 |
| 5,555,671 A | * | 9/1996 | Voight et al. | 43/54.1 |
| 5,788,488 A | * | 8/1998 | Grossman | 221/288 |
| 5,827,060 A | * | 10/1998 | Zdarsky | 433/77 |
| 5,901,494 A | * | 5/1999 | Reed | 43/44.81 |
| 6,032,404 A | * | 3/2000 | Cincibus | 43/55 |
| 6,125,569 A | * | 10/2000 | Link | 43/4 |
| 6,240,672 B1 | * | 6/2001 | Huppert | 43/44.8 |
| 6,421,951 B1 | * | 7/2002 | Kuhl | 43/55 |
| 6,625,921 B2 | * | 9/2003 | Friederichs, III | 43/4 |
| 6,651,377 B1 | * | 11/2003 | Pleasants | 43/55 |
| 6,895,711 B1 | * | 5/2005 | Nakamichi | 43/42.53 |
| 6,915,899 B2 | * | 7/2005 | Lin | 43/54.1 |
| 6,944,986 B1 | * | 9/2005 | Gonzalez et al. | 43/4 |
| D519,599 S | * | 4/2006 | Smith | D22/144 |
| 7,360,669 B2 | * | 4/2008 | Drajan | 221/266 |
| 7,559,436 B2 | * | 7/2009 | Bieger | 221/266 |
| 7,788,844 B1 | * | 9/2010 | Ruzicka | 43/54.1 |
| 7,793,458 B2 | * | 9/2010 | Eisbrenner | 43/4 |
| 7,805,879 B1 | * | 10/2010 | Copeland | 43/4 |
| 8,087,200 B1 | * | 1/2012 | Ferriss | 43/44.8 |
| 2005/0205598 A1 | * | 9/2005 | Gelardi | 221/266 |
| 2008/0244955 A1 | * | 10/2008 | Wilson | 43/4 |
| 2010/0065576 A1 | * | 3/2010 | Verheij | 221/42 |
| 2011/0056115 A1 | * | 3/2011 | Sebile | 43/44.81 |

\* cited by examiner

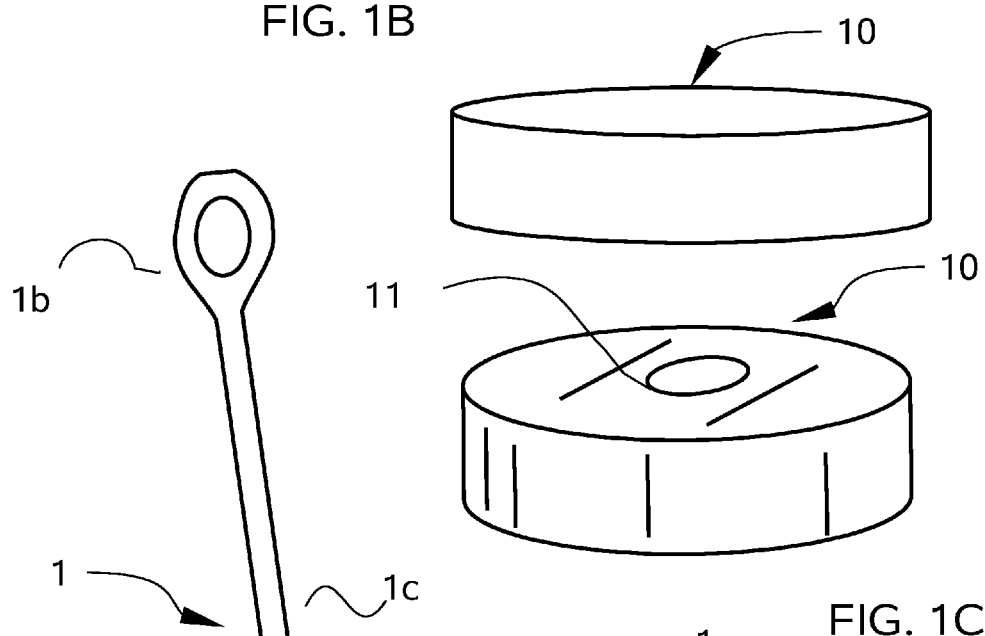
FIG. 1B
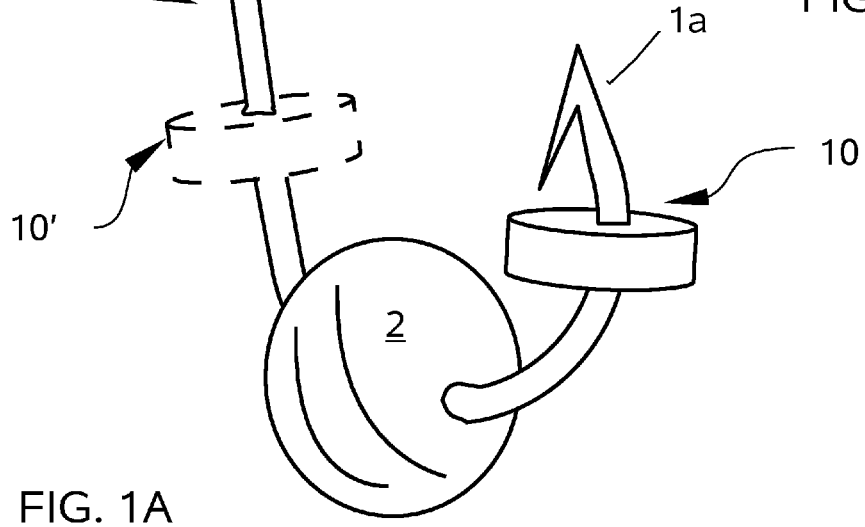
FIG. 1C
FIG. 1A

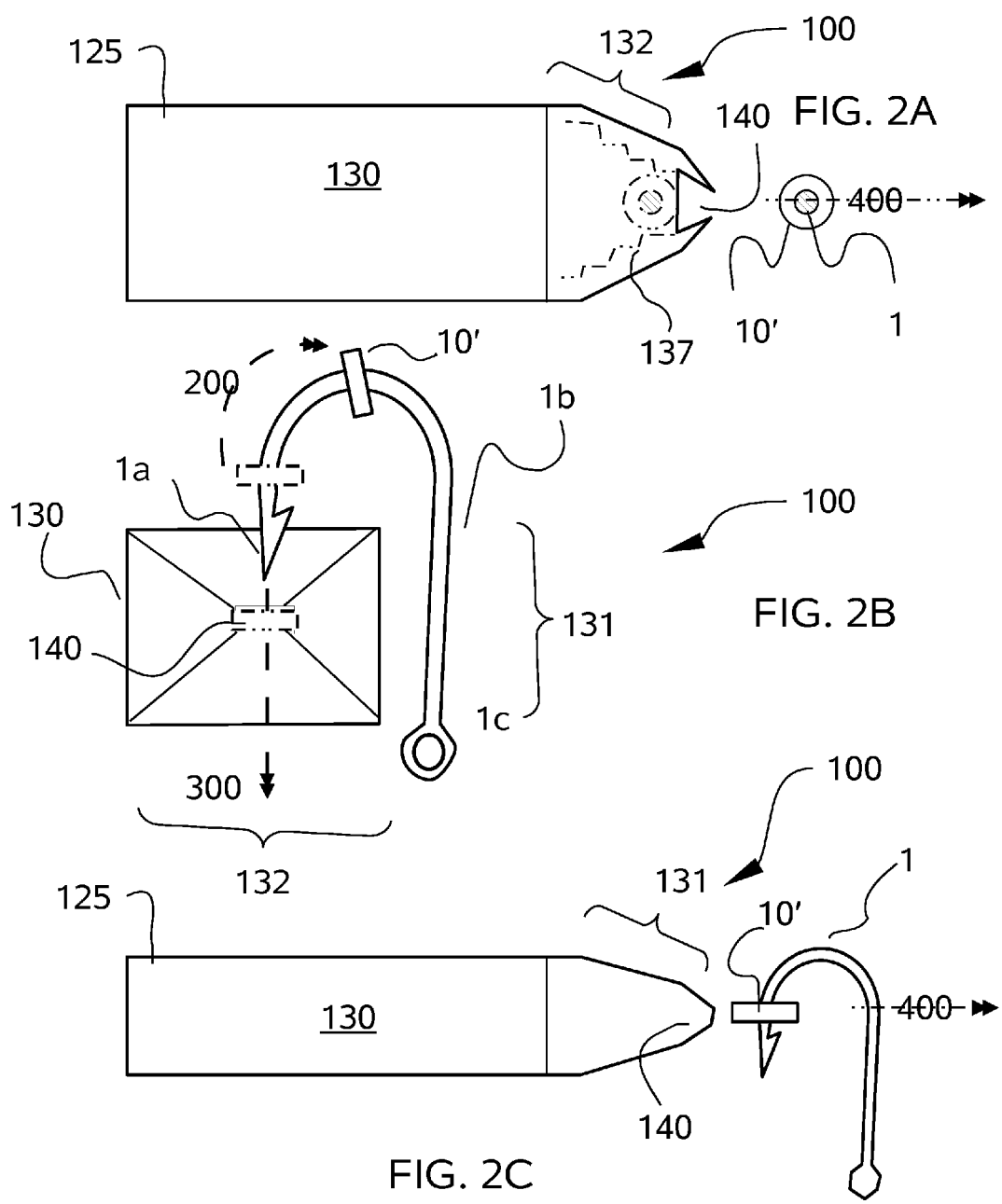

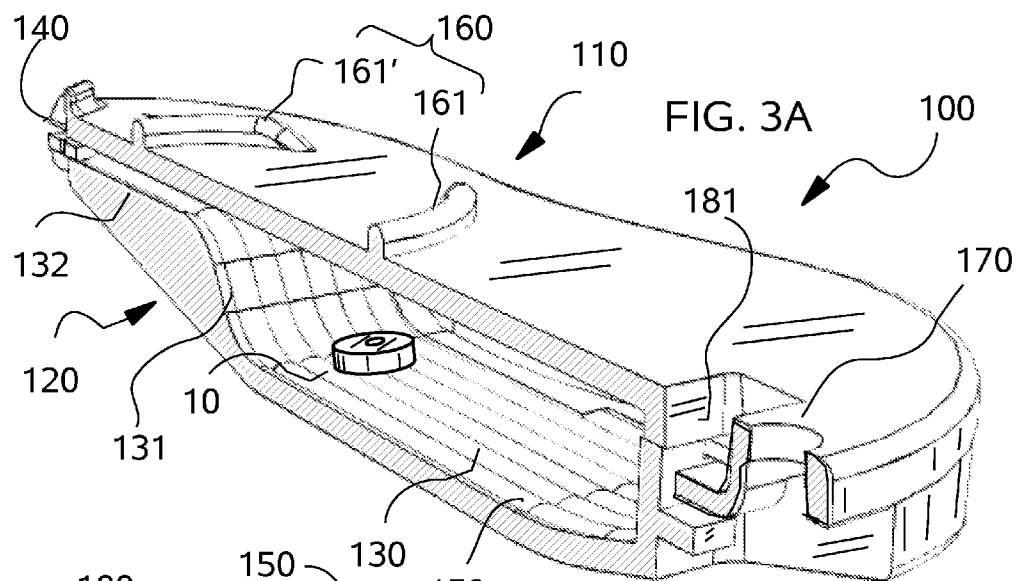
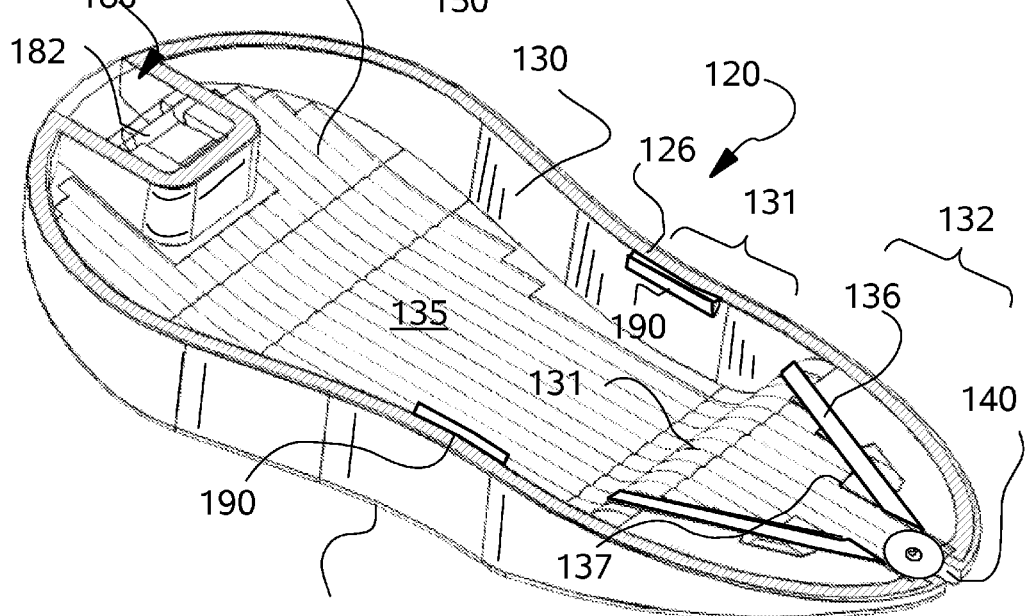

BAIT RETAINER AND DISPENSER APPARATUS

CROSS REFERENCE TO RELATED APPLICATIONS

The present application claims priority to the US Provisional Patent Application of the same title, filed on Aug. 24, 2009, having application Ser. No. 61/236,482, which is incorporated herein by reference.

BACKGROUND OF INVENTION

The present invention relates to a device and method for retaining bait or lures on fishing hooks.

Loss of bait while fishing is more than an annoyance for recreational fisherman, as rare and expensive lures can be lost. Further, it can cause a loss in productivity and yield for commercial fisherman that use live bait.

Others have tried to solve this problem using specialized hooks for retaining bait. However, these methods have not gained commercial success, most likely because of the added cost of the hooks, the limited versatility as well as the difficulty of threading the bait with the added retaining mechanism in place. Others have recognized the need for more versatile bait retaining devices that can be used with standard fishing hooks and lures. Prior art US patents show bait retainers of a tubular and ovulating grips that can be threaded onto the hook around the bait, as well as wires and clamps that are part of the fishhook (U.S. Pat. Nos. 6,141,900, 6,240672 and 4,827,657 being most typical of the closest prior art). However, while the devices appear to be simple, they are not convenient to apply to the baited hook in the typical fishing environment of a variety of weather conditions that easily cause wet and windy conditions. This is particularly the case because such devices, being small, are easy to lose before they are even applied to the hook.

It is therefore a first object of the present invention to provide an improved device and method that saves baits and lures from loss.

It is another object of the present invention to provide a means for rapid dispensing and insertion of such bait retainers on fishhooks.

It is yet a further object of the invention to provide such a dispensing means that is easily accessible and portable for convenient use while fishing in the most challenging environments.

It is still another object of the invention to provide such a dispensing means in the form of a highly reliable device, preferably that does not require moving parts.

Still another object of the invention is to provide a safe method of dispensing such highly reliable bait retainer, particularly in light of the sharp points on fishhooks.

It is another object of the invention to be able to provide more naturally appearing bait for increased productivity of catching fish.

SUMMARY OF INVENTION

In the present invention, the first object is achieved by providing a process for setting a bait retainer on a fish hook, the process comprising the steps of providing a dispenser containing a plurality of elastic disks with a opening at the edge for retaining and presenting a single elastic disk for removal there from, manipulating the dispenser to advance a single elastic disk to be retained in the opening where the central portion is accessible from the exterior of the opening in the dispenser, inserting a fish hook point through the center of the disk via the relative downward movement of the fish hook tip, removing the disk from the dispenser by laterally translating the hook away from the opening in the dispenser.

A second aspect of the invention is characterized by a bait retaining dispenser comprising an upper shell and a lower shell connected to the upper shell wherein at least one of said upper and lower shell have a concavity facing the other shell, and wherein the upper and lower shell are disposed in removable engagement so that the concavity define s a cavity for holding a plurality of disk shaped bait retainers; an opening at the edge of the dispenser for retaining a single disk shaped bait retainer that is connected to the cavity, wherein the cavity tapers in width and thickness toward said opening to permit only a single bait retainer to enter the opening.

The above and other objects, effects, features, and advantages of the present invention will become more apparent from the following description of the embodiments thereof taken in conjunction with the accompanying drawings.

BRIEF DESCRIPTION OF THE DRAWINGS

FIG. 1A is a perspective view of two disks used as bait retainers on a fishhook.

FIG. 1B is a perspective view of a first embodiment of the bait retaining disk in FIG. 1.

FIG. 1C is a perspective view of a second embodiment of the bait retaining disk in FIG. 1.

FIG. 2A is a plan view of an embodiment of the bait retaining disk dispenser.

FIG. 2B is a front elevation view of the bait retaining disk dispenser of FIG. 2A.

FIG. 2C is a side elevation of the bait retaining disk dispenser of FIGS. 2A and 2B.

FIG. 3A is a cross-section perspective view of the assembled shells that form the disk retaining cavity of another embodiment of the bait retaining disk dispenser.

FIG. 3B is a perspective view of the lower cavity of the dispenser in FIG. 3A to illustrate the tapered regions that terminate in the opening channel where the bait retainer are removed from the device with the fishhook.

DETAILED DESCRIPTION

Figure 4:
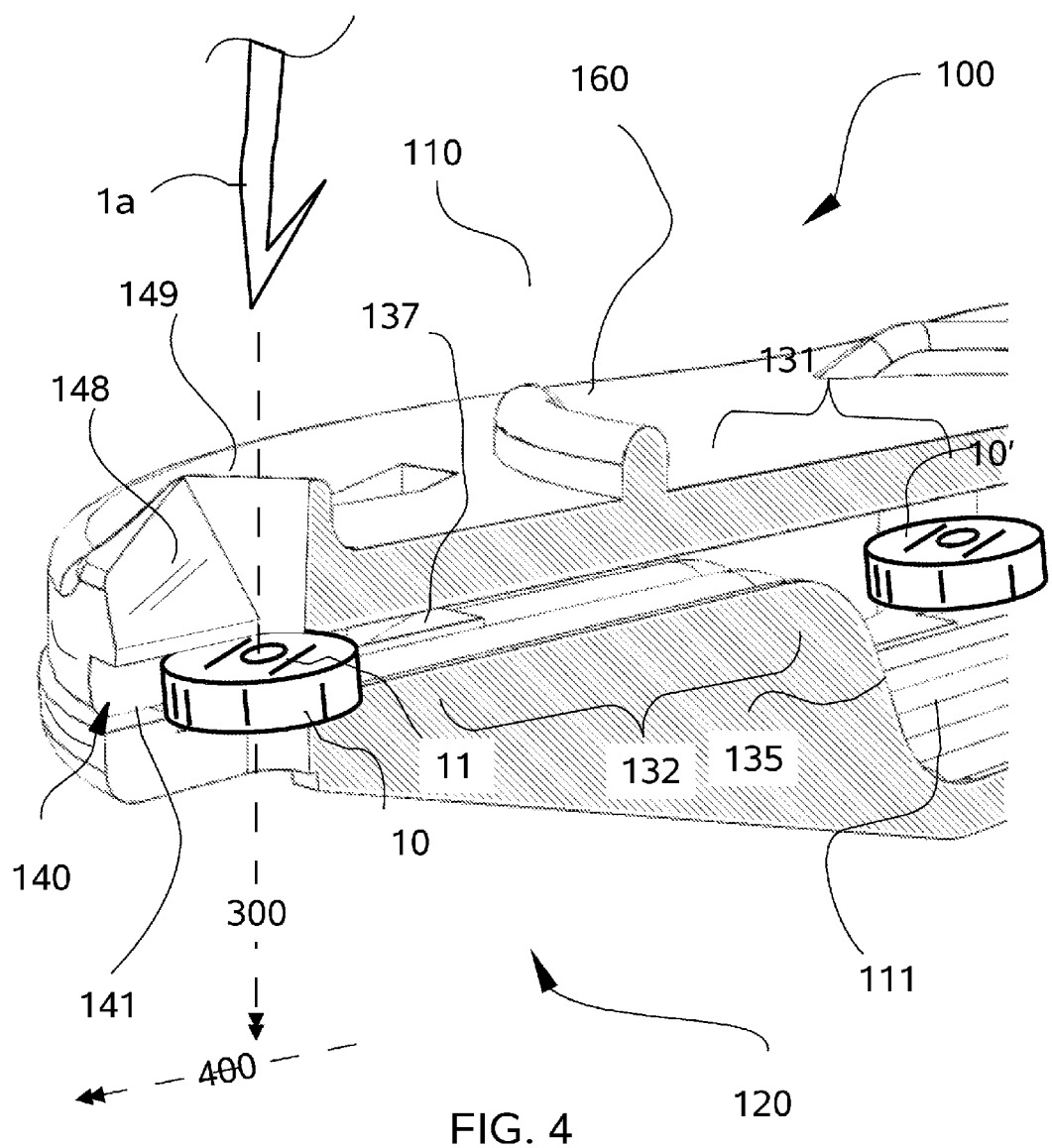
FIG. 4 is a cut away perspective view to illustrate the disk retaining function of the channel opening in the embodiment of the dispenser shown in FIGS. 3A and 3B.

Referring to FIGS. 1 through 5, wherein like reference numerals refer to like components in the various views, there is illustrated therein a new and improved bait retainer and dispenser apparatus, the dispenser apparatus generally denominated 100 herein.

In accordance with the present invention, FIG. 1 illustrates the use of the bait retainer 10, to hold bait 2 on a fishhook 1. The bait retainer is an elastic disk 10 when penetrated in the center by the shaft 1c of the fishhook 1 to which it sticks to prevent bait form sliding past it. Preferably the elastic disk 10 has a preformed hole, perforation, punch or slit 11 in the center of the disk 10 to accommodate the shaft 1c of the fishhook 1. The bait retainers 10 are threaded onto the shaft 1c of the fishhook land surround the bait 2 limiting its motion on shaft 1c and preventing it from loss or inadvertent removal. The bait retainers 10, when circular in cross section preferably have an outer diameter of about 0.150", with a hole 11 providing an inner diameter of about 0.012" and a thickness of about 0.038". The bait retaining disks 10 can be used with either natural or artificial baits and allows a natural presentation of baits.

While disks 10 of the above dimensions are suitable for use with a plurality of hook sizes and styles, it should be apparent that the dimensions can be changed to more preferably accommodate a particular size or style of fishhook. Any hole or perforation in the disk 10 is smaller than the diameter of the fishhook shaft and is thus or closed by the elasticity of the disk when threaded onto the fishhook. To the extent the disk 10 does not tear easily, it may or may not need a preformed hole but can optionally have a puncture in the center to aid in the opening and sticking to the fishhook shaft. Further, the disk 10 need not have a circular cross-section, but can also have a square, rectangular, octagonal and the like. Generally, disk 10 should be much wider than it's thickness, so it is easy to thread onto the curved fishhook, but retains bait. Preferably, the width of disk 10 is about 3 to 4 times the thickness, or more. The thickness is generally in the range of about 0.02 to 0.06 inches, but more preferably about 0.04 inches thick. Further disks 10 can be any color, such as clear or blending with the bait, lure or surroundings, as well as a distinctive color to catch the attention of further attract a particular species of fish. It is generally preferably that the disks 10 have an outer diameter that is at least about 3 times the thickness to aid in threading and also block bait 2 from moving past it. It should be appreciated that the disks can be made wider or stiffer to accommodate different types of bait 2 and fishhooks 1.

A currently preferred type and source of such disks 10 are pre-notched silicone dental stops available from Dentsply Maillefer of Ballaigues, Switzerland.

In accordance with another aspect of the present invention, circular disk form of the bait retainer 10 is readily dispensed form the container 100 shown in FIG. 2-5. The container has a cavity 130 that is sealed by a portal or removable portion, such as 125 shown in FIGS. 2A and 2C, or what can generally can be considered to an upper shell 110 that is engaged in a substantially sealed connection to the lower shell 120 to form a cavity 130. Either portion 125 is removed or the shells 110 and 120 are opened to insert and then store bait retainers 10 until dispensed from the cavity 130 via opening 140 therein. Opening 140 is preferably configured at one side of cavity 130 for temporarily retaining and presenting a single bait retaining disk 10 for removal from the dispenser 100.

Further, the portion of the cavity 130 should taper in thickness toward opening 140, as shown for pyramidal tapers 132 and 131 that are orthogonal in FIG. 2A-C.

More preferably, as shown in the embodiment of FIG. 3-4, at least one of the upper 110 and lower 120 shells has a concave surface 111 that tapers in the width and thickness of the cavity toward the opening 140 to accommodate a single disk 10.

FIG. 2 also illustrates a method of attaching the bait 2 and bait retainers 10 and 10' to a fishhook, having a barb end 1a and an opposing eyelet end 1b.

First upon providing the dispenser 100, it loaded with the bait retainers 10, either by opening the shells 110 and 120 or via a removable portal 125. Next, preferably by agitating the dispenser 100, at least one of the retainer disks 10 from the cavity 130 descends or transfers through the tapers 131 and 132 to be disposed in the opening 140 or channel 141 wherein the center portion of the disk is accessible from above. Then as shown in FIG. 2B, a fishhook tip 1a is inserted with the downward motion shown by arrow 300 through the perforation 11 or a central portion in the disk 10.

The fishhook 1 is optionally baited after the first retainer 10' is inserted on shaft 1b so that a second retainer disk 10 can then be inserted to hold the bait or lure 2 on shaft 1b from the other side closer to the point 1a of fishhook 1. Depending on the size and type of bait or lure used relative to the fish hook 1, it can be retained with just the single disk 10, omitting the first retaining disk 10'. The retainer disk 10 and 10' are optionally moved to the eyelet end 1c of fishhook shaft 1b either before or after removing the hook 1 from the position in channel 141. The retainer disks 10 and 10' can be moved by hand along the direction of arrow 200, or by moving the fishhook 1 in the same direction while the disk 10 is retained in channel 141.

Disk 10 is then removed from the dispenser 100 by laterally translating the fishhook 1 away from the opening 140 in the direction of arrow 400.

Thus, it should be appreciated that device 100 is sized to provide a cavity 130 for retaining multiple bait retainer disks 10. Opening 140 is dimensioned as a partially opened channel 141 to admit only a single elastic disk 10 with at least one of friction or an end stop to retain the hook until the disk 10 is distorted to remove it from the opening 140 or channel 141. This opening channel 141 is also wider than the diameter of the fishhook shaft, so the later can be removed after insertion of the disk 10 by lateral movement.

As further illustrated in the more preferred embodiment of FIG. 3-4, the first taper 131 is a concave portion 111 of at least one shell, such as the lower shell 120 in FIGS. 3 and 4, and has a smooth continuously curving surface 135 that extends toward the opening 140

It should be appreciated that the preferred disks are not only elastic, but are sufficiently soft and thus tacky enough to remain in the fixed position on shaft 1c after placement as shown in FIG. 2, even in wet conditions. However, such properties also make them more likely to self adhere or cling to the internal surface of a dispenser 100. Accordingly, the most preferred aspects of the invention enable disk like bait retainer 10 to be reliably dispensed. Toward this end, the dispenser 100 in FIGS. 3 and 4 also has grooves 150 on the interior of at least one of the upper and lower shell, but preferably both. These grooves 150 run toward the opening and have a half round profile to minimize friction/stiction with the elastic disks 10. Preferably, the groove 150 dimensions are similar to the diameter of the elastic disk so the disk is supported by the groove peaks, minimizing the contact area of the disk surface with the inner wall of the cavity 130.

In this more preferred embodiment, the cavity 130 first tapers in thickness in region 131 to less than the height of two disks, then in a second taper in region 132 the width is reduced to less than the width of two disks at the opening channel 140. Thus, the wider portion 135 of the cavity 130 stores elastic disks 10. It is also more preferably that the first taper 131 (in thickness) is a gradual curve to a thinner triangular region 132 having the second taper in width. Most preferably, this triangular region 132 has walls 136 that are disposed at obtuse angles with respect to the principle plane axis of the second taper 132.

Further improving the delivery of single disk to channel 141 and precluding clogging of opening 140 with multiple disks are stepped walls 137 along the final taper before opening 140.

The dispenser 100 can be opaque, but is more preferably at least one of translucent or transparent so different colored disks show through for easy identification.

The channel opening 141 to cavity 130 is slightly wider than the disk 10 to allow the disk to move from storage area of the cavity 130 into loading area at opening 140. Most preferably the channel 141 has at least one of further narrowing of the channel or a designed stopping part to preclude the disk 10 from moving any further after it exits cavity 130 until it is deliberately threaded onto the fishhook 1 and removed while disposed thereon.

Another aspect of the most preferred embodiment of the invention is to provide either the upper or lower shell with an external funnel or inverted pyramidal recess 148 above the channel opening for guiding the fishhook tip to the disk. The external funnel or inverted pyramidal recess 148 is defined by walls 149 that extend upward above the exterior surface of the upper shell.

Further, for the user's convenience when fishing, the device also includes external grip 160, which in the embodiment shown in FIG. 3 is to opposing external ridges 161 and 161' having a semicircular shape for engaging the ball of the thumb or another finger there between. The side walls of the dispenser also have a midsection concavity 126 to accommodate a portion of the hand opposing the thumb for gripping.

Most preferably device 100 also includes an external ring or snap (not shown) for attachment to gear or clothing is connected to the dispenser 100 via the hole 170 on the upper shell 110 outside of the region of cavity 130.

It should be appreciated that although different features and aspects of the invention have been described with respect to a particular embodiment, such features and aspects may be combined with others in alternative embodiments. For example, the upper or lower shell can be a flat plate, provided the other shell has at least a concave portion to hold bait retaining disks. These shells can engage and lock via either a snap fit, one or more screws that extend from one shell to a nut or threaded fitting in the other shells, external clamp or a screw cap in either one or both shells, as well as at least one hinge and another type of fastener as stated above and the like.

Figure 5:
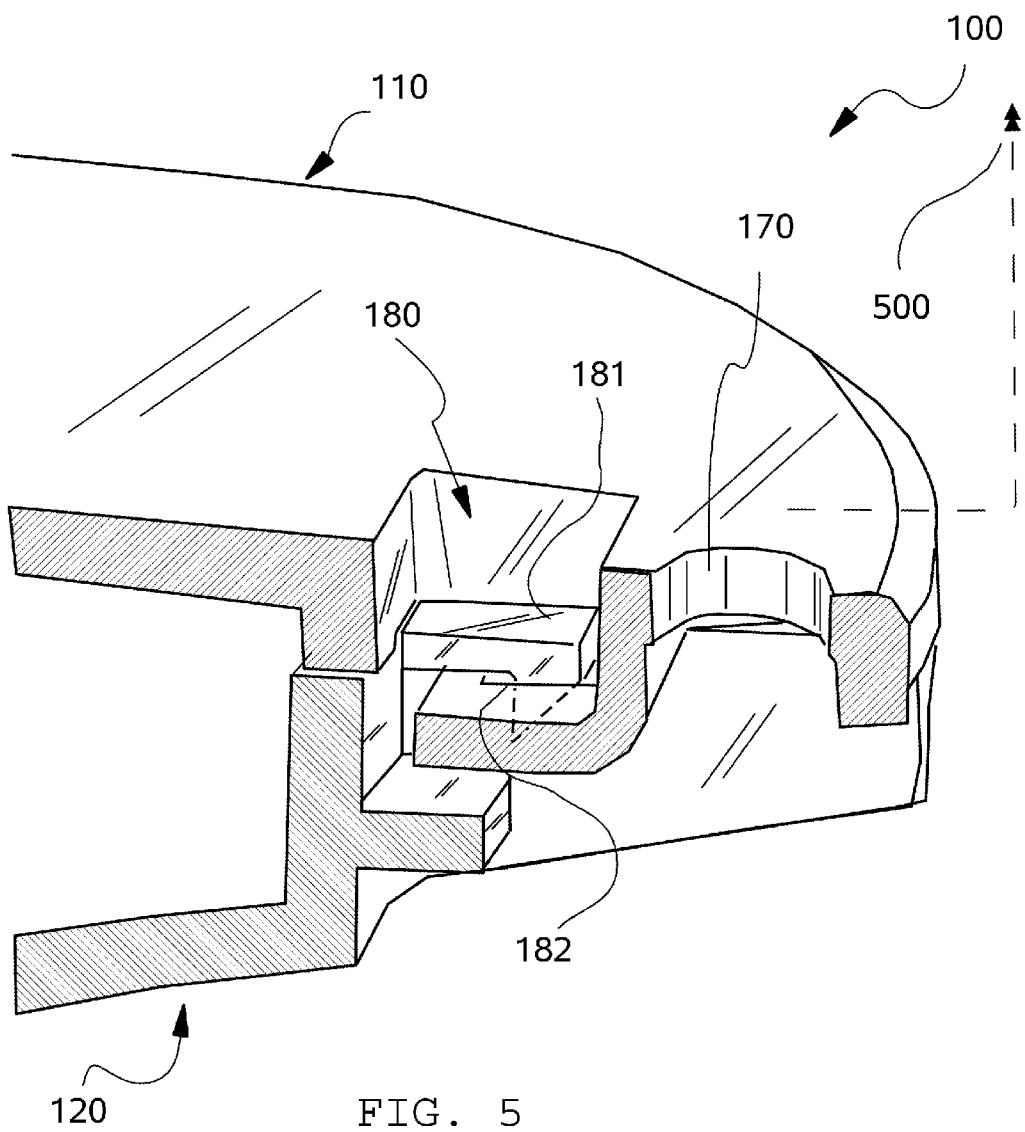
FIG. 5 is a cut away perspective view to illustrate in more detail a portion of the latching mechanism of the embodiment shown in FIGS. 3A and 3B.

A preferred form of the locking means is snap fit mechanism 180 having a flexible detent arm 181 that engages the edge of the receiving hole 182, which is shown in the FIG. 3AB and FIG. 5. The receiving hole 182 in this embodiment is recessed below the planar upper face of the upper shell 110 having the grip 160. The flexible detent arm 181 is also recessed into a connected portion of the lower shell 120. Preferably the shells 110 and 120 have several portions of the opposing edges insure the alignment of the shells to assure secure closure as after the single detent is engaged. Once such embodiment of such aligning means are protrusion 191 just inside the wall of shell 120. When the detect arm 181 is released the upper shell 110 can slide backwards and is then readily lifted away in direction of arrow 500.

Opening channel 141 can be formed in either or both upper and lower shell. Further, this opening channel width can be the same as the OD of the disk to hold it by stiction, or can have a slightly greater width but have a partially closed end wall to retain one disk until it is removed with the fishhook.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

I claim:

1. A dispenser for bait retainers comprising:
   a) a container providing a fillable cavity and having a first sealable opening for filling the cavity therein with a plurality of bait retaining disks, the container having an upper face on a first side of the cavity and a lower face on a side of the cavity opposite from the first side, in which the lower face is opposite the upper face,
   b) a second opening at an edge of the container for retaining a bait retainer that is connected to the cavity, wherein the cavity tapers in width and thickness toward said second opening to permit only a single bait retainer to enter the second opening, and further comprising a plurality of grooves on an interior of one of the upper and lower faces, said plurality of grooves being disposed between junctions of surfaces of the dispenser, wherein said grooves have a primary axis that is generally directed toward the second opening.

2. The dispenser for bait retainers according to claim 1 wherein the grooves have half round profiles orthogonal to the primary groove axes, the grooves having peaks disposed there between.

3. A dispenser for bait retainers comprising:
   a) a container providing a fillable cavity and having a first sealable opening for filling the cavity therein with a plurality of bait retaining disks, the container having an upper face on a first side of the cavity and a lower face on an opposite side of the cavity from the first side, in which the lower face is opposite the upper face,
   b) a second opening at an edge of the container for retaining a bait retainer that is connected to the cavity, wherein the cavity tapers in width and thickness toward said second opening to permit only a single bait retainer to enter the second opening,
   c) a guiding channel communicating with the second opening in the cavity for receiving and retaining a bait retainer in position for removal and separation from the container, the guiding channel having an upper horizontal opening and a lower horizontal opening that is below and opposing the upper horizontal opening, each horizontal opening in the guiding channel being associated with a respective one of the first side and opposite side of the cavity of the cavity, and further comprising a wall that extends away from at least one of the upper and lower faces of the container, the wall surrounding the guiding channel.

4. The dispenser for bait retainers according to claim 3, further comprising a plurality of disked shaped bait retainers disposed therein.

5. The dispenser for bait retainers according to claim 4 wherein the widths of the upper and lower horizontal openings in the guiding channel are less than a diameter of the bait retaining disks.

6. The dispenser for bait retainers according to claim 3 wherein at least one of the upper and lower horizontal openings in the guiding channel are disposed in a common plane with at least one of the upper and lower faces of the container.

7. The dispenser for bait retainers according to claim 3, and further comprising an open guiding means disposed above the guiding channel for guiding a fishhook tip to a bait retainer in the guiding channel.

8. The dispenser for bait retainers according to claim 7 wherein the open guiding means is selected from the group consisting of an external funnel and an inverted pyramidal recess.

9. The dispenser for bait retainers according to claim 3, and further comprising grooves on an interior of at least an inner surface of the cavity, the inner surface opposing at least one of the upper and lower faces of the cavity, wherein said grooves have primary axes that are generally directed toward the guiding channel.

10. The dispenser for bait retainers according to claim 9 wherein the grooves have half round profiles orthogonal to the primary axes of the grooves, the grooves having peaks disposed there between.

11. The dispenser for bait retainers according to claim 3 wherein the cavity within the container is formed by;
   a) an upper shell,
   b) a lower shell connected to the upper shell and at least one of said upper and lower shells have a concavity facing the other shell.

12. The dispenser for bait retainers according to claim 11 wherein the upper and lower shells are disposed in removable engagement to provide the first sealable opening of the container wherein a triangular shaped base formed in a portion of either the upper shell or the lower shell by opposing sidewalls disposed at obtuse angles with respect to a principle plane of the triangular shaped base has a tapered reduction in width.

13. A dispenser for bait retainers according to claim 3, further comprising at least one of an external ring or snap for attachment to gear or clothing.

14. A dispenser for bait retainers according to claim 3, further comprising an external grip means.

15. A dispenser for bait retainers comprising:
   a) an upper shell,
   b) a lower shell connected to the upper shell, each shell having a periphery in which a common periphery of the upper and lower shells defines an edge of the dispenser, and further, wherein;
      i) at least one of said upper and lower shells has a concavity facing the other of said upper and lower shells, and wherein;
      ii) the upper and lower shells are disposed in removable engagement so that the concavity defines a cavity for holding a plurality of bait retainers;
   c) an opening at the edge of the dispenser for retaining a single bait retainer that is connected to the cavity, wherein the cavity tapers in width and thickness toward said opening to permit only a single bait retainer to enter the opening,
   d) further comprising grooves on an interior of at least one of the upper and lower shells, wherein said grooves have primary axes that are generally directed toward the opening at the edge of the dispenser and have half round profiles orthogonal to the primary groove axes, the grooves having peaks disposed there between.

16. The dispenser for bait retainers according to claim 15, further comprising a plurality of disk shaped bait retainers disposed therein.

17. The dispenser for bait retainers according to claim 15, wherein a distance between peaks of adjacent grooves is not substantially more than the diameter of disk shaped bait retainers disposed therein.

18. The dispenser for bait retainers according to claim 15, further comprising:
   a) a channel attached to the opening for receiving and retaining a single bait retainer in position for removal and separation from the container, and
   b) at least one of an external funnel and inverted pyramidal recess above the channel for guiding a fishhook tip to penetrate the single bait retainer retained in the channel.

19. The dispenser for bait retainers according to claim 15, further comprising at least one of an external ring or snap for attachment to gear or clothing.

20. The dispenser for bait retainers according to claim 15, further comprising an external grip means.

* * * * *